(No Model.)

F. MAIERHOFER.
BIRD TRAP.

No. 546,491. Patented Sept. 17, 1895.

Witnesses:
J. Halpenny
J. E. Sharon

Inventor:
Fritz Maierhofer
By his attorneys
Gridley & Hopkins

UNITED STATES PATENT OFFICE.

FRITZ MAIERHOFER, OF CHICAGO, ILLINOIS.

BIRD-TRAP.

SPECIFICATION forming part of Letters Patent No. 546,491, dated September 17, 1895.

Application filed April 1, 1895. Serial No. 544,079. (No model.)

*To all whom it may concern:*

Be it known that I, FRITZ MAIERHOFER, a citizen of the United States, residing at Chicago, in the county of Cook and State of Illinois, have invented certain new and useful Improvements in Bird-Traps, of which the following is a specification, reference being had to the accompanying drawings, which are made a part hereof, and in which—

Figure 1:
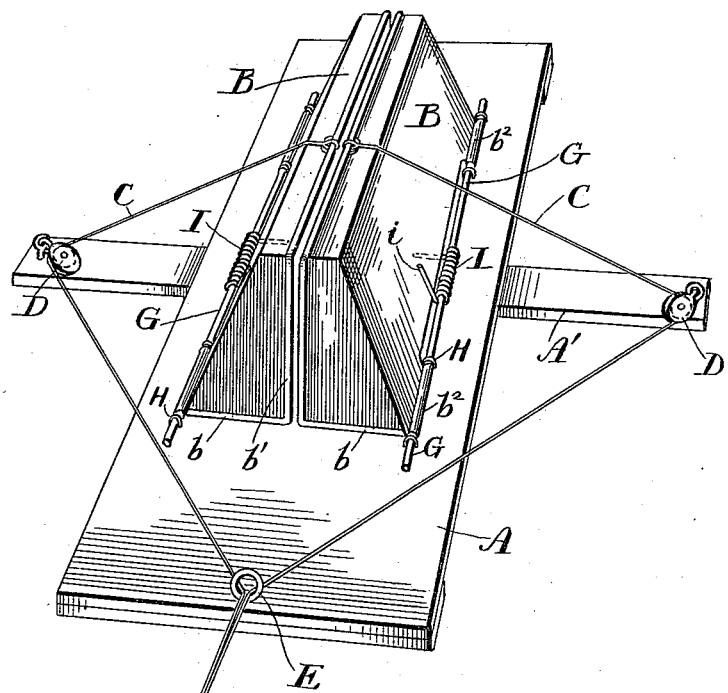
Figure 2:
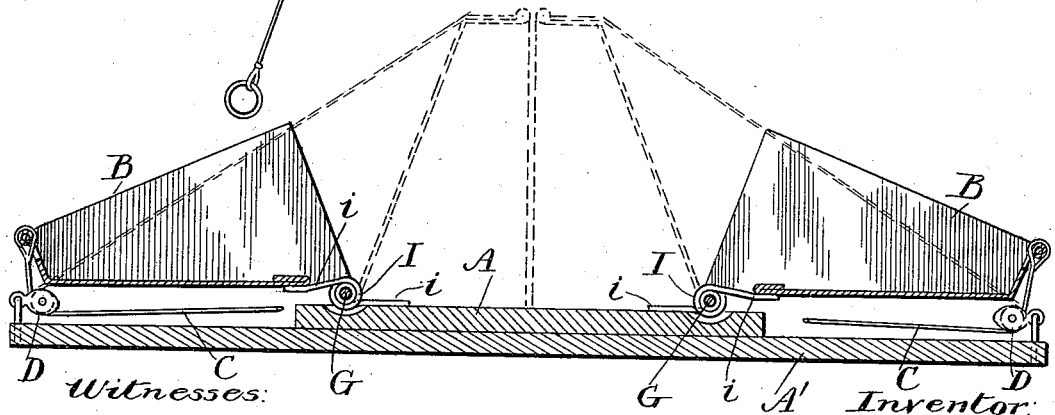

Figure 1 is a perspective view of a bird-trap embodying the invention, and Fig. 2 is a vertical transverse section thereof.

The object of the present invention is to provide an improved trap of the class used in gun practice; and the invention consists in the features of novelty that are particularly pointed out in the claim hereinafter.

The base may be of any desired construction, but I prefer to construct it of two boards A and A', to the former of which the coop-sections are hinged, and the latter of which partakes of the nature of arms, to which are secured the devices over which the operating-cords are trained. The coop is preferably made of sheet metal in two parts B, of such shape that when they are brought together in the closed position, as shown in Fig. 1 and indicated by dotted lines in Fig. 2, their edges $b$ will rest upon the base and their edges $b'$ will come sufficiently close together to confine the bird. To the top portion of each of the coop-sections is connected a cord C, which, as shown in the drawings, is trained over a pulley D, secured to the base, as aforesaid, the two cords being brought together at the end of the base and trained through an eye E, both being connected to a cord F, that extends to the place from which the trap is to be operated.

As shown in the drawings, the hinges of this two-part coop consist of tubular portions $b^2$, formed of the material of which the coop is made, rods G, passing through said tubular portions, and staples H, spanning the rods and driven into the base; but I desire to have it understood that my invention in its broadest aspects is not limited to hinges of any particular construction. I prefer, however, to construct them as shown in the drawings for the reason that the rods G form a convenient means for associating with the coop-sections springs I, by which they are held normally closed. These springs are made of pieces of wire coiled around the rods G and having their ends $i$ continued and arranged to bear upon the outside of the coop and the base, respectively. I desire to have it understood, however, that my invention is not limited to springs of any particular construction or arrangement.

Having thus described my invention, the following is what I claim as new therein and desire to secure by Letters Patent:

In a trap the combination of a base, a coop formed in two sections having flanges on three sides thereof, hinges connecting the fourth side of each section to the base, springs holding said sections normally closed, cords secured to the upper portions of said sections and suitable devices remote from the coop over which the cords are trained, substantially as set forth.

FRITZ MAIERHOFER.

Witnesses:
L. M. HOPKINS,
S. E. SHARON.